United States Patent [19]
Yamaguchi et al.

[11] Patent Number: 6,015,585
[45] Date of Patent: Jan. 18, 2000

[54] POWDER COATING PROCESS USING TWO OR MORE KINDS OF POWDER PAINT

[75] Inventors: Masayuki Yamaguchi; Yukihide Yamashita; Kenichiro Mori, all of Sayama, Japan

[73] Assignee: Honda Giken Kogyo Kabushiki Kaisha, Tokyo, Japan

[21] Appl. No.: 09/123,649

[22] Filed: Jul. 28, 1998

[30] Foreign Application Priority Data

Aug. 22, 1997 [JP] Japan ................................. 9-226462

[51] Int. Cl.⁷ ........................................................ B05D 1/02
[52] U.S. Cl. .............................. 427/8; 427/478; 427/485; 427/195; 427/345; 427/421
[58] Field of Search .................... 427/8, 470, 485, 427/486, 478, 407.1, 421, 195, 203, 345; 118/688, 602, 312, 712, 713

[56] References Cited

U.S. PATENT DOCUMENTS

| | | |
|---|---|---|
| 3,939,855 | 2/1976 | Wiggins . |
| 4,044,175 | 8/1977 | Coxon et al. . |
| 4,824,295 | 4/1989 | Sharpless ............................... 406/109 |
| 5,173,326 | 12/1992 | Krämer . |
| 5,658,616 | 8/1997 | Gross et al. . |

FOREIGN PATENT DOCUMENTS 62-71559   4/1987   Japan .

OTHER PUBLICATIONS

Communication from UK Patent Office and attached Search Report.

*Primary Examiner*—Fred J. Parker
*Attorney, Agent, or Firm*—Merchant & Gould P.C.

[57] ABSTRACT

Paints of different color brightness not deposited on the work to be coated in a powder coating process are recovered as a mixture, and a fresh paint of high or low color brightness is added to the mixture to adjust its color brightness and thereby prepare a fresh mixture of medium color brightness which can be used as a paint of medium color brightness.

1 Claim, 7 Drawing Sheets

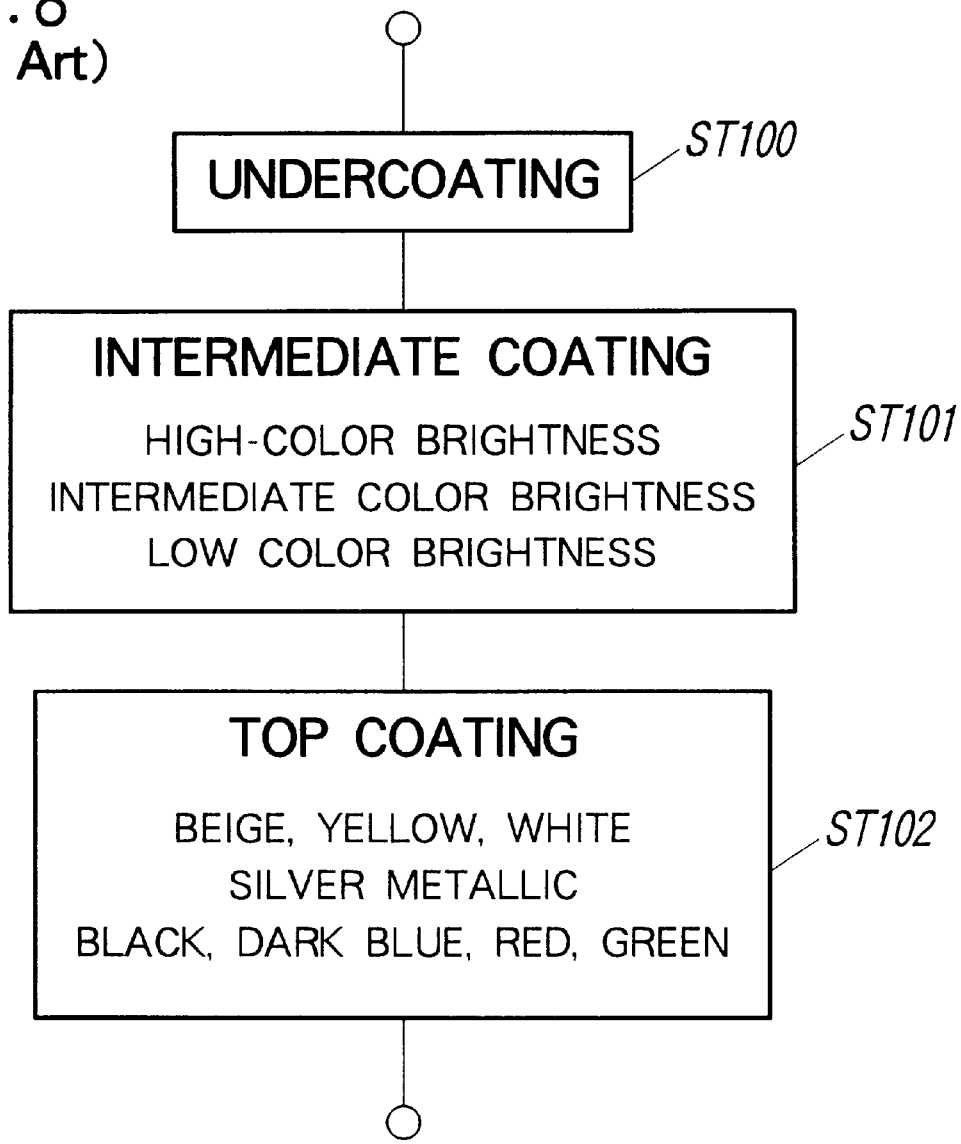

POWDER COATING PROCESS USING TWO OR MORE KINDS OF POWDER PAINT

BACKGROUND OF THE INVENTION

1. Field of the Invention

The present invention relates to a process and an apparatus for the powder coating of, for example, an automobile body (hereinafter referred to as work).

2. Description of the Related Art

FIG. 8 hereof is a flowchart showing a conventional process for coating an automobile body. The process includes Steps ST100 to ST102.

ST100 is the step of undercoating the work by eletrocoating. Its undercoating is done for making the work rustproof and enabling its top coating to form a surface maintaining a high level of luster.

ST101 is the step of intermediate coating the work by powder coating. Its intermediate coating is done for filling small flaws in its undercoating layer to obtain a smooth and lustrous finish and improving the durability of an overall coating on the work. Its powder coating is given by a paint having a color of, for example, high, medium or low brightness depending on the color of its top coating.

ST102 is the step of top coating the work. Its top coating is given for improving the appearance of the body and also protecting it. Its top coating is given by, for example, a paint having a light color such as beige, yellow or white, a paint having an intermediate color such as silver metallic, or a paint having a dark color such as black, dark blue, red or green.

If a paint having a light color is used for the top coating of the work, a powder paint having a color of high brightness is used for its intermediate coating. If a paint having an intermediate color is used for its top coating, a powder paint having a color of medium brightness is used for its intermediate coating. If a paint having a dark color is used for its top coating, a powder paint having a color of low brightness is used for its intermediate coating.

A powder coating apparatus is disclosed in, for example, Japanese Patent Laid-Open Publication No. SHO-62-71559. The apparatus includes spray guns, a recovery tank for recovering any powder paint sprayed by the guns, but not deposited on the work in a spray booth during one cycle of coating operation, a storage tank for storing the recovered paint, and a paint supply tank in which the recovered paint as supplied from its storage tank is mixed with a fresh paint supplied from its storage tank, so that their mixture may be supplied to the spray guns for coating the work during another cycle of coating operation. The apparatus can be used for coating a plurality of pieces of work continuously with a single kind of paint.

In the event, therefore, that three kinds of paints having high, medium or low levels, respectively, of color brightness have to be selectively used for intermediate coating as described above, it is necessary to employ a large scale of equipment including three lines of powder coating apparatus to be used with the three kinds of paints, respectively. If only a single line of apparatus is employed to make a compact scale of equipment, it is necessary to stop the operation of the line and remove the paint therefrom whenever a different paint has to be used for intermediate coating. This brings about a considerable reduction in the operating efficiency of the equipment. Moreover, the manual cleaning of the spray booth, or paint recovery tank is likely to allow the inclusion of dust or foreign matter in the paint.

SUMMARY OF THE INVENTION

It is, therefore, an object of this invention to provide an improved powder coating process and an improved powder coating apparatus which make it possible to realize an improved efficiency of coating operation and a compact scale of coating equipment.

According to a first aspect of this invention, there is provided a powder coating process using at least three kinds of powder paints having high, medium and low levels, respectively, of color brightness selectively for coating different pieces of work, and comprising the steps of recovering mixture of paints not deposited on any work, determining the color brightness of the mixture, adding a fresh paint having a high or low level of color brightness to the mixture to prepare a fresh mixture having a medium level of color brightness, and using the fresh mixture as a paint of medium color brightness.

The paints not deposited on any work to be coated are recovered as a mixture from a spray booth, and a fresh paint of high or low color brightness is added to the mixture to prepare a fresh mixture of medium color brightness which can be reused as a paint of medium color brightness in one and the same line of powder coating apparatus. The presence of only a single line of powder coating apparatus makes a compact scale of coating equipment. The recovery of the paints as a mixture makes it unnecessary to clean the spray booth, and paint recovering device manually or otherwise before a paint of different color brightness has to be used. Accordingly, it is possible to shorten the length of time for which the operation of the line has to be interrupted for cleaning purposes, and thereby to avoid any substantial reduction of its operating efficiency. Moreover, there is no longer any fear of dust or foreign matter being included in the paint.

According to a second aspect of this invention, there is provided a powder coating apparatus which comprises at least a pair of storage tanks for storing a powder paint of high color brightness and a powder paint of low color brightness, respectively, a first paint supply passage device for supplying a paint from one of the storage tanks to spray guns, a device for recovering a mixture of paints not deposited on work in a spray booth, a device for selecting a paint in accordance with the color brightness of the recovered mixture and delivering it from one of the storage tanks, a device for mixing the selected paint with the recovered mixture to prepare a fresh mixture, and a second paint supply passage device for supplying the fresh mixture to the spray guns as a paint of medium color brightness.

The mixing device is provided for mixing a fresh paint of high or low color brightness with the recovered mixture of paints to prepare a fresh mixture of medium color brightness. The second paint supply passage device is provided for supplying the fresh mixture to the spray guns. Thus, the recovered paints can be reused in the same apparatus.

The recovery of the paints as a mixture makes it unnecessary to clean the spray booth, and paint recovering device manually or otherwise before a paint of different color brightness has to be used. Accordingly, it is possible to shorten the length of time for which the operation of the line has to be interrupted for cleaning purposes, and thereby to avoid any substantial reduction of its operating efficiency. Moreover, there is no longer any fear of dust or foreign matter being included in the paint.

BRIEF DESCRIPTION OF THE DRAWINGS

Preferred embodiments of this invention will now be described, by way of example only, with reference to the accompanying drawings, in which:

FIG. 8 is a flowchart showing the steps of coating an automobile body by a conventional process.

DETAILED DESCRIPTION OF THE PREFERRED EMBODIMENTS

Figure 1:
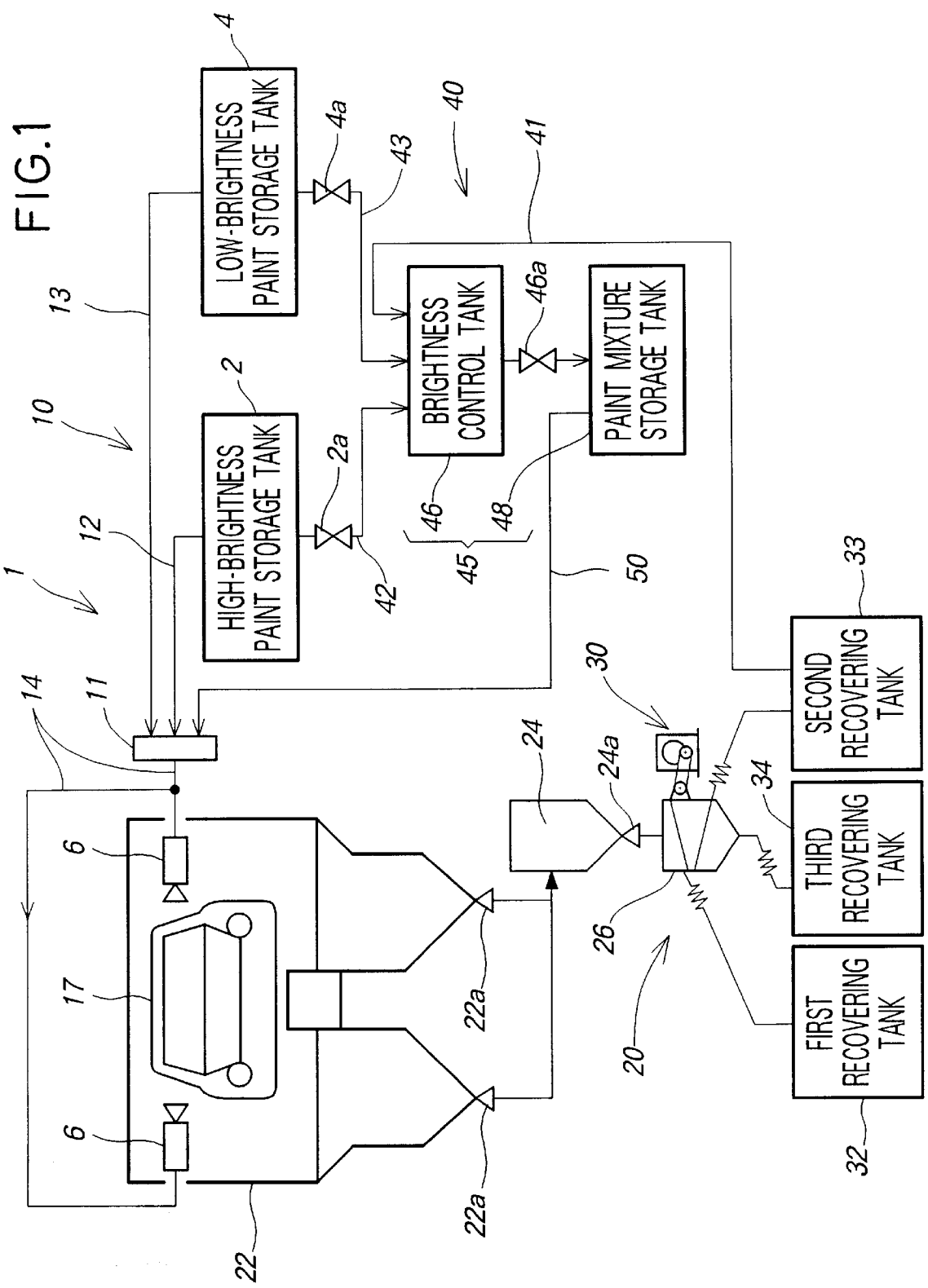
FIG. 1 is a diagram showing the general arrangement of a powder coating apparatus according to a first embodiment of this invention.

Referring first to FIG. 1, a powder coating apparatus 1 embodying this invention includes a high-brightness paint storage tank 2 for storing a powder paint of high color brightness, and a low-brightness paint storage tank 4 for storing a powder paint of low color brightness. A first paint supply passage device 10 is provided for supplying the paints from the storage tanks 2 and 4 to spray guns 6. A paint recovering device 20 is provided for recovering a mixture of the paints sprayed by the spray guns 6, but not deposited on work 17 to be coated. The paint recovering device 20 will be described in further detail with reference to FIG. 2. A selective paint delivery device 40 is provided for selecting a paint of high or low color brightness in accordance with the brightness of color of the recovered paint mixture and delivering it from the storage tank 2 or 4. A paint mixing device 45 is provided for adding the selected paint to the recovered paint mixture to prepare a fresh paint mixture. A second paint supply passage device 50 is provided for supplying the fresh paint mixture to the spray guns 6 as a paint of medium color brightness.

The first paint supply passage device 10 comprises a first passage 12 extending from the high-brightness paint storage tank 2 to a changeover valve 11, a second passage 13 extending from the low-brightness paint storage tank 4 to the changeover valve 11, and a third passage 14 extending from the changeover valve 11 to the spray guns 6. The changeover valve 11 serves to change the paint supplied to the spray guns 6, so that a paint of high, low or medium color brightness may be supplied thereto, as required.

The selective paint delivery device 40 comprises a first delivery passage 41 extending from a second recovery tank 33 to a brightness control tank 46 as will hereinafter be described in detail, a second delivery passage 42 extending from the high-brightness paint storage tank 2 to the brightness control tank 46, and a third delivery passage 43 extending from the low-brightness paint storage tank 4 to the brightness control tank 46.

The mixing device 45 comprises the brightness control tank 46 in which a fresh paint is mixed with the recovered paint mixture to prepare a fresh paint mixture as a paint of medium color brightness, and a paint mixture storage tank 48 for storing the paint mixture prepared in the tank 46.

The second delivery passage 42 has an on-off valve 2a, and the third delivery passage 43 has an on-off valve 4a, too. A spray booth 22 has a pair of rotary valves 22a at its bottom. An on-off valve 46a is also provided between the brightness control tank 46 and the paint mixture storage tank 48.

Figure 2:
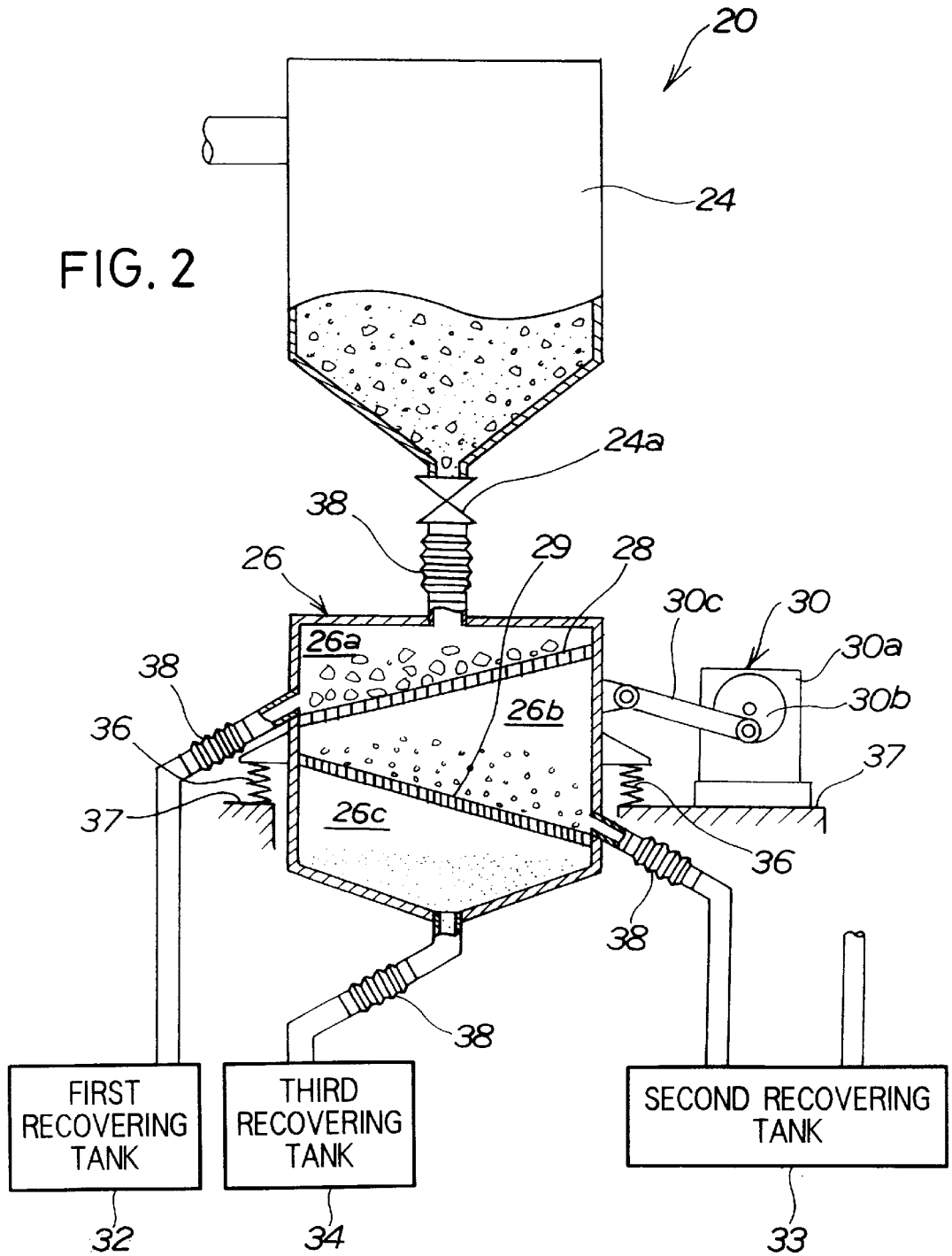
FIG. 2 is an enlarged front elevational view, partly in section, of the paint recovering device in the apparatus shown in FIG. 1.

Attention is now directed to FIG. 2 showing the paint recovering device 20 in further detail. It includes a collecting tank 24 situated under the spray booth 22 (FIG. 1) and connected to its bottom. A classifying tank 26 is situated under the collecting tank 24, and connected to its bottom. The classifying tank 26 holds a first screen 28 situated in its upper portion and sloping downward to the left as viewed in the drawing, and a second screen 29 situated below the first screen 28 and sloping downward to the right as viewed in the drawing. A vibrating mechanism 30 is connected to the classifying tank 26 for vibrating it. The classifying tank 26 has an upper classifying chamber 26a defined above the first screen 28 and communicating with a first recovering tank 32, a middle classifying chamber 26b defined between the first and second screens 28 and 29 and communicating with the second recovering tank 33, and a lower classifying chamber 26c defined below the second screen 29 and communicating with a third recovering tank 34.

The first screen 28 may, for example, be a 250-mesh one and leave paint particles larger than 250 meshes in the first classifying chamber 26a, and the second screen 29 may, for example, be a 150-mesh one and leave paint particles having a size of 150 to 250 meshes in the second classifying chamber 26b.

The vibrating mechanism 30 comprises a motor 30a, an eccentric cam 30b attached to the output shaft of the motor 30a and an arm 30c connecting the classifying tank to the cam 30b. The classifying tank 26 is vibratably supported on a base 37 by springs 36. Flexible hoses 38 are connected between the tanks 24 and 26, and between the tank 26 and each of the tanks 32 to 34 for absorbing the vibration of the classifying tank 26. A rotary valve 24a is provided under the bottom of the collecting tank 24.

Figure 3:
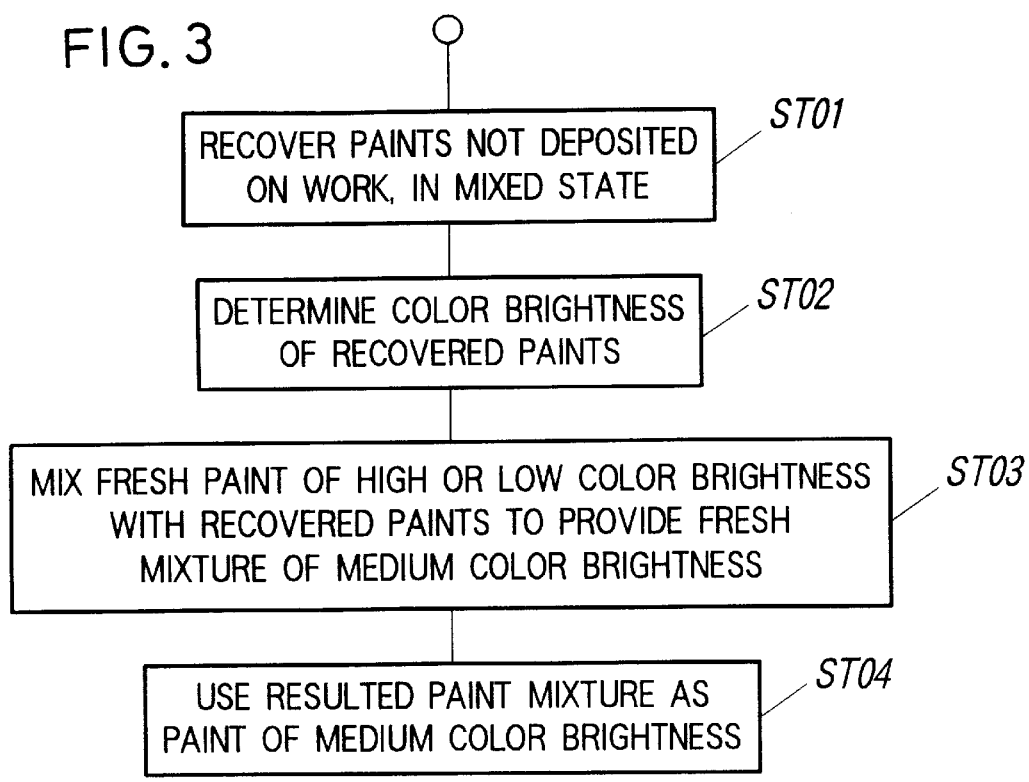
FIG. 3 is a flowchart showing the steps of powder coating as carried out by the apparatus shown in FIG. 1.

Description will now be made of the operation of the apparatus with reference to FIGS. 3 to 5, 6A and 6B. FIG. 3 shows a powder coating process consisting of four steps ST01 to ST04. ST01 is the step of recovering any paints sprayed against work by the spray guns, but not deposited thereon, as a mixture thereof.

Figure 4:
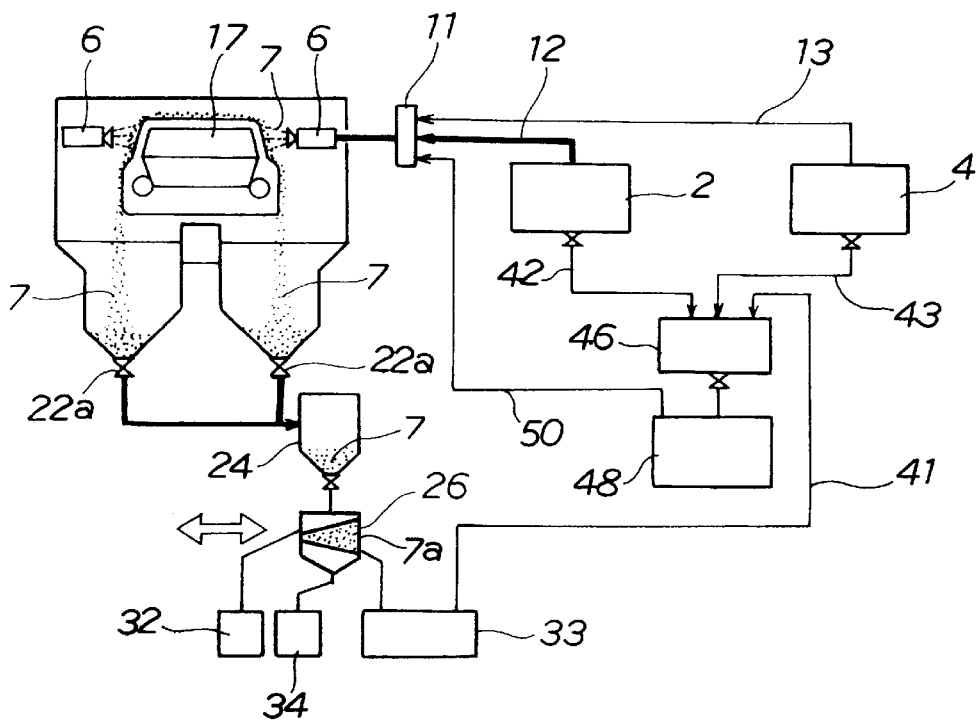
FIG. 4 is a diagram illustrating the step of recovering any powder paint of high color brightness sprayed against a piece of work, but not deposited thereon, as shown in FIG. 3.
Figure 5:
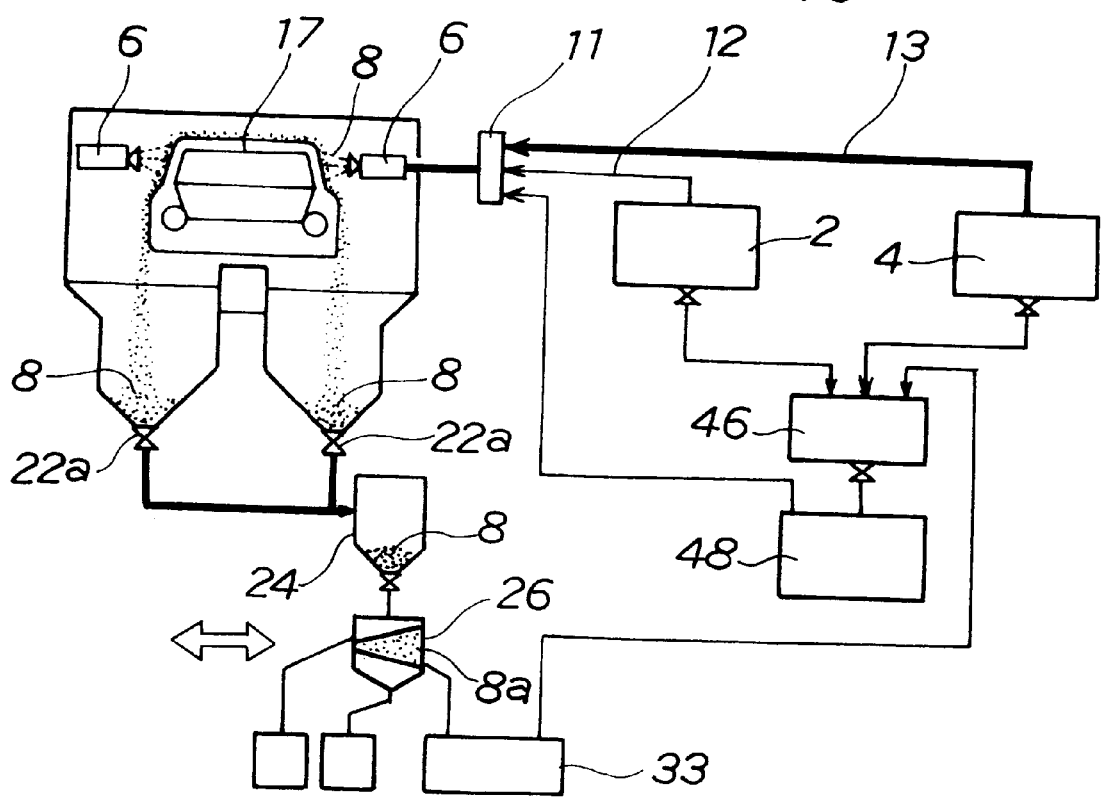
FIG. 5 is a diagram illustrating the step of recovering any powder paint of low color brightness sprayed against the work, but not deposited thereon, as shown in FIG. 3.

Reference is made to FIGS. 4 and 5 for further details of Step St01. Referring first to FIG. 4, a paint of high color brightness is supplied from its storage tank 2 to the spray guns 6 through the changeover valve 11 staying in its position in which it connects the spray guns 6 to the storage tank 2. The paint 7 is sprayed against the work 17 by the spray guns 6. The rotary valves 22a are opened to allow any paint 7 not deposited on the work 17 to drop into the collecting tank 24. The paint 7 is, then, allowed to drop from the collecting tank 24 into the classifying tank 26, and classified, while the tank 26 is vibrated by the vibrating mechanism 30 (FIGS. 1 and 2) in the directions shown by white arrows in FIG. 4, whereby a powder 7a having a particle size of 150 to 250 meshes is collected in the second recovery tank 33.

Referring now to FIG. 5, the changeover valve 11 is switched to its position in which it connects the spray guns 6 to the low-brightness paint storage tank 4, and a paint 8 of low color brightness is supplied from its storage tank 4 to the spray guns 6. The paint 8 is sprayed against the work 17 by the spray guns 6, and the paint 8 not deposited thereon is collected in the collecting tank 24, and classified in the classifying tank 26, whereby a powder 8a having a particle size of 150 to 250 meshes is collected in the second recovery tank 33.

Figure 6A:
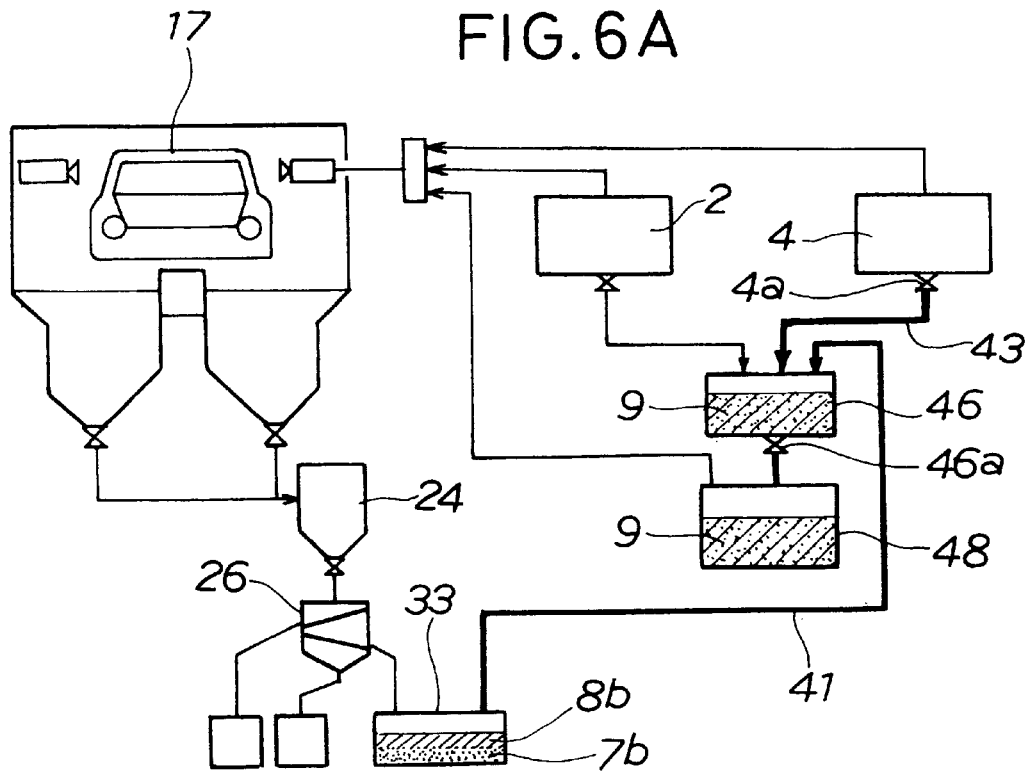
FIG. 6A is a diagram illustrating the steps of determining the color brightness of the recovered paints and mixing a fresh paint therewith, as shown in FIG. 3.

ST02 is the step of determining the brightness of color of a mixture of the recovered paints. Referring to FIG. 6A, the paints 7a and 8a of high and low color brightness, respectively, as recovered are mixed together in the second recovery tank 33, and their mixture is examined for its color brightness. This color brightness examination is carried out using a highly-sensitive, self-recording spectrophotometer employing a double-monochromator such as UV-3100PC (brand name) available from Shimadzu Corp. Its color brightness may, for example, be of a level slightly lower than high, or approximately halfway between high and medium.

ST03 is the step of mixing a fresh paint of high or low color brightness with the mixture of the recovered paints to prepare a fresh mixture of medium color brightness. Referring to FIG. 6A, the mixture of the recovered paints 7a and 8a is delivered into the brightness control tank 46 through the first delivery passage 41, and the on-off valve 4a under the low-brightness paint storage tank 4 is turned on to deliver a fresh paint from the tank 4 to the brightness control tank 46. The paint is mixed with the paint mixture in the brightness control tank 46, and its delivery is continued until a fresh paint mixture 9 of medium color brightness is obtained. Then, the on-off valve 46a under the brightness control tank 46 is turned on to transfer the paint mixture 9 into the paint mixture storage tank 48.

Figure 6B:
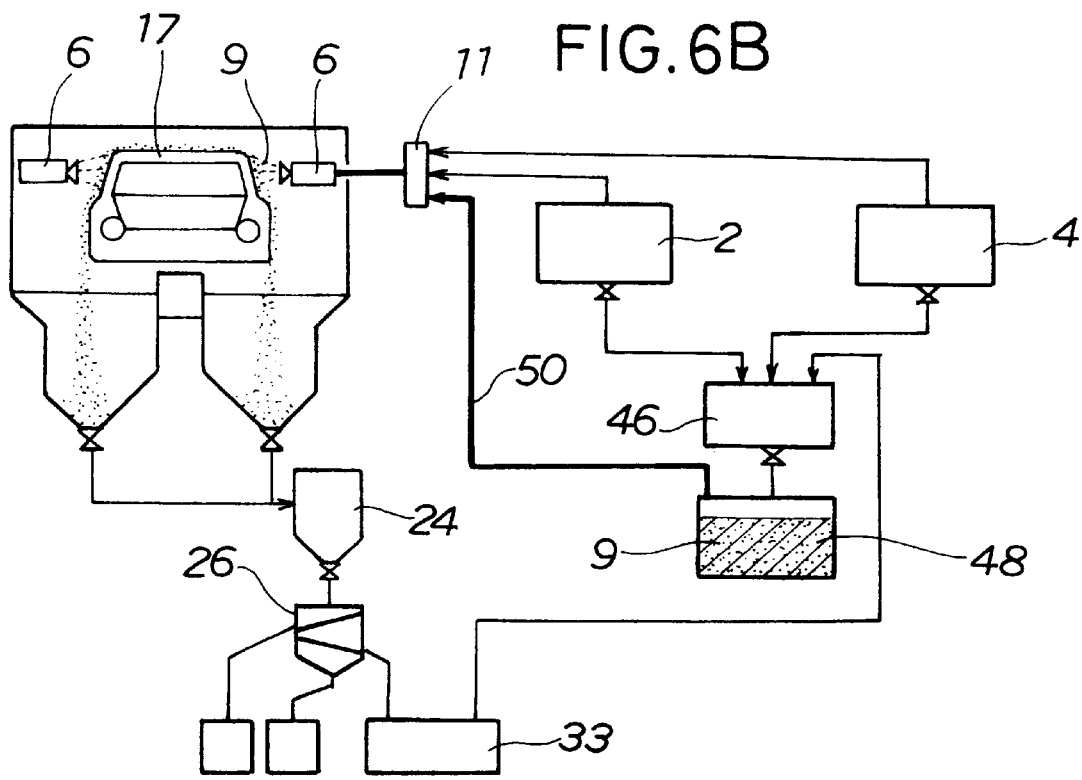
FIG. 6B is a diagram illustrating the step of using the resulting mixture as a paint of medium color brightness for spraying against the work.

ST04 is the step of using the paint mixture as a paint of medium color brightness. Referring to FIG. 6B, the paint 9 of medium color brightness is supplied from its storage tank 48 to the changeover valve 11 and from the changeover valve 11 to the spray guns 6, and is sprayed against the work 17 by the spray guns 6.

Although it has been stated about the paint mixture as obtained in the second recovery tank 33 that its color brightness may be of a level slightly lower than high, or approximately halfway between high and medium, it is possible that it may have a medium level of color brightness, and if such is the case, it can, of course, be used as a paint of medium color brightness without calling for the addition of any paint of high or low color brightness. Although it has been stated that the paints having a particle size of 150 to 250 meshes are recovered, it is, of course, possible to recover paints having a different range of particles sizes by employing screens having a different mesh size.

Figure 7:
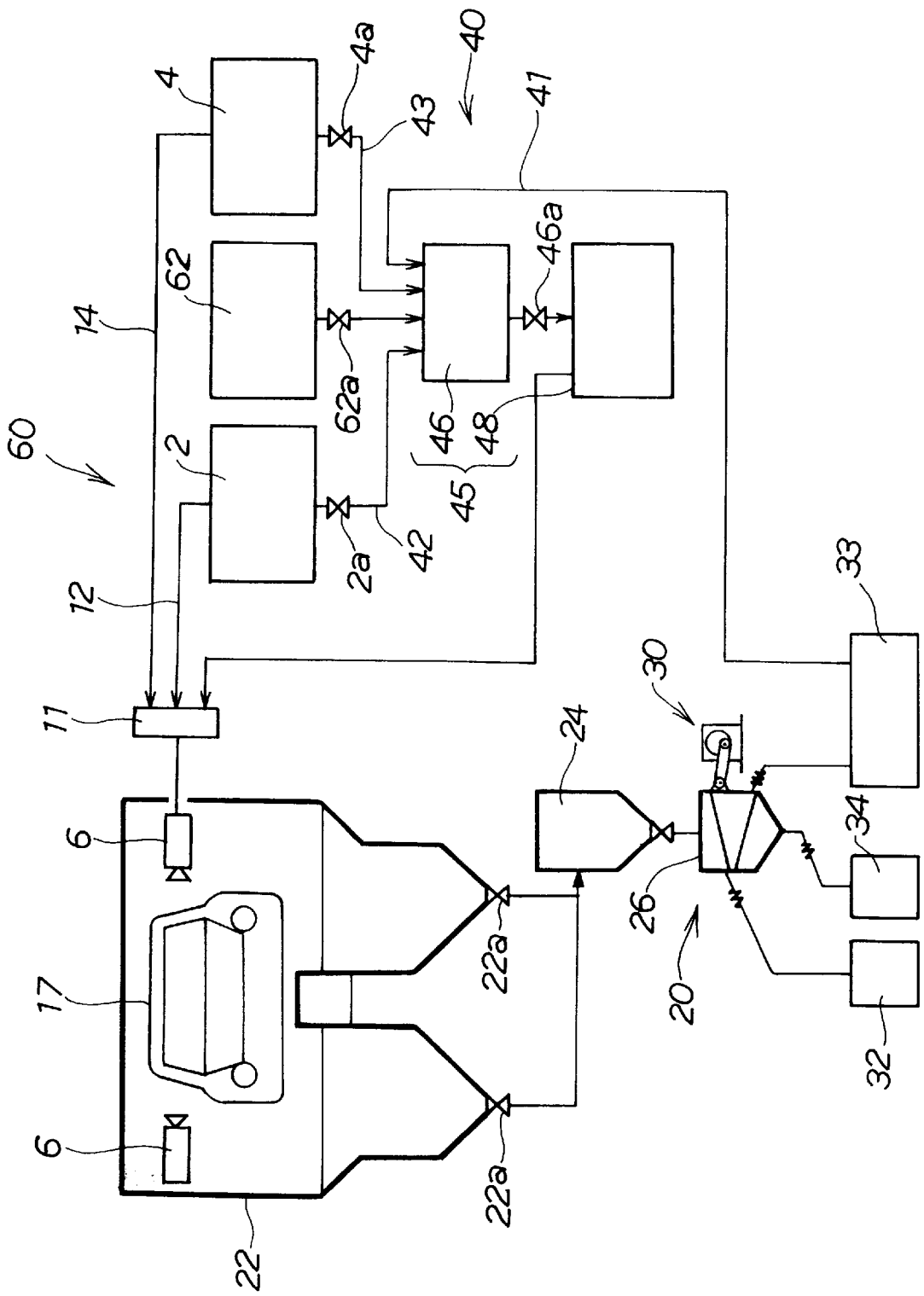
FIG. 7 is a diagram similar to FIG. 1, but showing a second embodiment of this invention.

Reference is now made to FIG. 7 showing the schematic arrangement of a powder coating apparatus according to a second embodiment of this invention. The apparatus 60 includes a medium-brightness paint storage tank 62 which differentiates it from the apparatus 1 according to the first embodiment as shown in FIG. 1. The medium-brightness paint storage tank 62 stores a paint of medium color brightness, and is provided with an on-off valve 62a in a passage leading to a brightness control tank 46. The apparatus 60 is otherwise identical in construction to the apparatus 1 shown in FIG. 1, and no further description thereof is made, insofar as like numerals are used to denote like parts in both of FIGS. 1 and 7.

The medium-brightness paint storage tank 62 is useful as it delivers a paint of medium color brightness for coating the work 17 when a paint recovering device 20 has failed to produce a paint mixture of medium color brightness. The failure of the paint recovering device 20 does not make it essential to interrupt the operation of the apparatus, but the tank 62 contributes to raising the operating efficiency of the apparatus.

The tank 62 is also useful even if a paint mixture as recovered in a second recovery tank 33 may be of medium color brightness, since the addition of a fresh paint from the tank 62 to the recovered paint mixture gives a paint of still higher quality which is applicable to the work 17 still more reliably.

Obviously, various minor changes and modifications of the present invention are possible in the light of the above teaching. It is therefore to be understood that within the scope of the appended claims, the present invention may be practiced otherwise than as specifically described.

What is claimed is:

1. A powder coating process using at least two kinds of powder paints having different levels of color brightness selectively for coating different pieces of work, said process comprising the steps of:

spraying a first powder paint of said at least two kinds of powder paints against at least a first of said different pieces of work;

after spraying said first powder paint, spraying a second powder paint of said at least two kinds of powder paints against at least a second of said different pieces of work;

recovering a mixture of said first and second powder paints which have failed to be deposited on any of said different pieces of work;

determining the color brightness of said mixture;

adding a fresh supply of said first or second powder paint to said mixture to prepare a fresh mixture having a desired level of color brightness which is intermediate between said different levels of color brightness of said first and second powder paints; and using said fresh mixture as a powder paint of immediate color brightness level.

\* \* \* \* \*